(12) United States Patent
Engheta et al.

(10) Patent No.: US 8,254,227 B2
(45) Date of Patent: Aug. 28, 2012

(54) FREQUENCY-MODULATED CODING AND DATA RECORDING AND STORAGE USING PLASMONIC NANOSTRUCTURES

(75) Inventors: Nader Engheta, Wayne, PA (US); Alessandro Salandrino, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 669 days.

(21) Appl. No.: 11/914,275

(22) PCT Filed: May 10, 2006

(86) PCT No.: PCT/US2006/018140
§ 371 (c)(1),
(2), (4) Date: Jun. 17, 2008

(87) PCT Pub. No.: WO2006/122209
PCT Pub. Date: Nov. 16, 2006

(65) Prior Publication Data
US 2009/0080297 A1    Mar. 26, 2009

Related U.S. Application Data

(60) Provisional application No. 60/679,491, filed on May 10, 2005.

(51) Int. Cl.
*G11B 15/52* (2006.01)
(52) U.S. Cl. .................................. 369/47.35; 369/59.21
(58) Field of Classification Search ............... 369/13.33, 369/286
See application file for complete search history.

(56) References Cited

U.S. PATENT DOCUMENTS

| | | | | | |
|---|---|---|---|---|---|
| 4,866,692 | A | * | 9/1989 | Saito et al. | 369/59.12 |
| 4,999,810 | A | * | 3/1991 | Vo-Dinh | 365/124 |
| 5,463,609 | A | * | 10/1995 | Inagaki et al. | 369/109.02 |
| 6,180,415 | B1 | * | 1/2001 | Schultz et al. | 436/518 |

(Continued)

FOREIGN PATENT DOCUMENTS

JP          04-062090          *  2/1992

(Continued)

OTHER PUBLICATIONS

Krauss and Chou, Nano-compact discs, Sep. 30, 1977; Univ. of Minnesota, Dept. of Electrical Engr.*

(Continued)

*Primary Examiner* — Paul Huber
(74) *Attorney, Agent, or Firm* — Woodcock Washburn, LLP

(57) ABSTRACT

A frequency-modulated coding and data recording and storage device that uses plasmonic-dielectric nanostructures of concentric two-layer core-shell design to store data includes a flat transparent substrate having a top surface divided into cells with side dimension d on the order of tens of nanometers and a core-shell plasmonic-dielectric nanostructure disposed in each cell. Each plasmonic nanostructure of concentric core-shell has a predetermined ratio of radii and a predetermined aspect ratio such that when an infrared or visible wavelength signal is applied to each said core-shell plasmonic-dielectric nanostructure a peak scattering amplitude of the applied signal is at different plasmonic resonance frequencies for core-shell plasmonic-dielectric nanostructures with different ratio of radii and different aspect ratios. The sampled values of a signal to be recorded are assigned to each cell and the ratio of radii and/or aspect ratios of the core-shell plasmonic-dielectric nanostructures in the assigned cells are selected to provide a corresponding plasmonic resonant frequency.

16 Claims, 16 Drawing Sheets

U.S. PATENT DOCUMENTS

| | | | | |
|---|---|---|---|---|
| 6,243,350 | B1 * | 6/2001 | Knight et al. | 369/126 |
| 7,167,623 | B2 * | 1/2007 | Sato et al. | 385/129 |
| 7,345,980 | B2 * | 3/2008 | Richard | 369/101 |
| 7,348,124 | B2 * | 3/2008 | Hwang et al. | 430/270.12 |
| 7,569,188 | B2 * | 8/2009 | Stockman et al. | 422/82.05 |
| 7,691,176 | B2 * | 4/2010 | Niidome et al. | 75/345 |
| 7,790,066 | B2 * | 9/2010 | Wang et al. | 252/514 |
| 7,824,761 | B2 * | 11/2010 | Misawa et al. | 428/209 |
| 2001/0002315 | A1 | 5/2001 | Schultz et al. | |
| 2002/0167887 | A1 * | 11/2002 | Moscovitch | 369/121 |
| 2003/0015428 | A1 * | 1/2003 | Becker et al. | 204/547 |

FOREIGN PATENT DOCUMENTS

| | | | |
|---|---|---|---|
| WO | WO 99/46351 | * | 9/1999 |
| WO | WO02/43061 | * | 5/2002 |

OTHER PUBLICATIONS

Physical Review Letters, Drastic Reduction of Plasmon Damping in Gold Nanorods, Sonnichsen et al, Feb. 18, 2002, vol. 88 No. 7, pp. 077402-1 to 077402-4.*

H. Ditlbacher et al. "Spectrally Coded Oprtrical Data Statorage by Metal Nanoparticles" Optics Letters, Optical SOciety of America, Washington, US, vol. 25, No. 8 Apr. 15, 2000, pp. 563-565.*

Fontana, E., "Surface Plasmon Resonance on a recordable compact disk," Microwave and Optoelectronics Conference 2003, IMOC 2003, Proceedings of the 2003 SBMO/IEEE MTT-S International vol. 2, Sep. 20-23, 2003, pp. 667-672.

P.B. Johnson and R.W. Christy, "Optical Constants of the Noble Metals," Phys. Rev. B, Solid State, Dec. 15, 1972, vol. 6, No. 12, pp. 4370-4379.

* cited by examiner

FREQUENCY-MODULATED CODING AND DATA RECORDING AND STORAGE USING PLASMONIC NANOSTRUCTURES

CROSS-REFERENCE TO RELATED APPLICATIONS

This application is the National Stage of International Application No. PCT/US2006/018140 filed May 10, 2006, which claims the benefit of U.S. Provisional Application No. 60/679,491, filed May 10, 2005, the disclosure of which is incorporated herein by reference in its entirety.

FIELD OF THE INVENTION

The present invention relates to techniques for frequency-modulated coding of signals, data recording and storage in the IR and visible regimes using plasmonic nanostructures. The method of the invention provides higher storage capacities by using nano-scale-sized structures with various ratios of radii or various aspect ratios for two-layer (core-shell) nanostructures made of a combination of plasmonic and dielectric materials. Such a method can lead to smaller unit size for memory in the storage media.

BACKGROUND OF THE INVENTION

In conventional compact disk (CD) storage devices, a 1 μm×1 μm surface area includes 4 cells for data storage. Efforts at increasing the storage density to date have focused primarily on the use of shorter wavelength laser devices in the lower visible range to record and read the stored data. Storage devices are desired that decrease the cell size so that the size of storage devices may be further reduced. The present invention addresses this need in the art.

SUMMARY OF THE INVENTION

The present invention addresses the aforementioned need in the art by providing a frequency-modulated (FM) coding and data recording and storage device that provides decreased cell size using plasmonic nanostructures. The device in accordance with the invention includes a flat transparent substrate having a top surface divided into cells with side dimension d on the order of tens of nanometers and a two-layer plasmonic-dielectric nanostructure disposed in each cell. Each plasmonic-dielectric nanostructure is in the form of a concentric two-layer core-shell and has a predetermined ratio of radii between the layers, greater than zero and less than one, and a predetermined aspect ratio of each layer such that when an infrared or visible wavelength signal is applied to each concentric plasmonic-dielectric nanostructure a peak scattering amplitude of the applied signal is at different plasmonic resonance frequencies with respect to a plasmonic nanostructure with a different ratio of radii and/or a different aspect ratio. The sampled values of a signal to be recorded are assigned to each cell and the ratio of radii and/or different aspect ratios of concentric plasmonic-dielectric nanostructures in the assigned cells are selected to provide a corresponding plasmonic resonant frequency. The substrate may be made of standard glass or conventional $TiO_2$-doped glass, for example. The concentric plasmonic-dielectric nanostructures, on the other hand, are made of a concentric two-layer core-shell structure made of a noble metal with a dielectric as the core (or as the shell) where the shell and the core are printed on the substrate using electron-beam lithography or other suitable techniques. The plasmonic-dielectric nanostructures may be concentric core-shell with the predetermined ratio of radii and a predetermined aspect ratio or may be cylindrical core-shell plasmonic-dielectric nanostructures having a uniform thickness but with different ratio of radii and different aspect ratios in a plane of the substrate.

The recorded data is read by applying a light source that emits broadband infrared or visible light and is positioned below the substrate so as to illuminate the substrate with a collimated beam at an angle larger than a critical angle of the substrate whereby only an evanescent wave substantially interacts with the plasmonic nanostructures on the top surface of the substrate. The reflection of the evanescent wave off of the plasmonic nanostructures in each cell is read using a near-field scanning optical microscope (NSOM) positioned above the cells.

In a 3-D embodiment, a plurality of the flat transparent substrates are disposed on top of one another, each transparent substrate having a top surface divided into cells with side dimension d on the order of tens of nanometers and a plasmonic nanostructure disposed in each cell.

The concentric core-shell plasmonic-dielectric nanostructures may have N different ratio of radii and/or N different aspect ratios and therefore N different plasmonic-dielectric resonant frequencies, each plasmonic resonant frequency representing a respective N-ary digit of the recorded data, where N=2, 3 or a larger value.

The invention also includes a method of coding signals and storing the coded signals using plasmonic-dielectric nanostructures. Such a method in accordance with the invention includes the steps of assigning each of N sampled values possible for coding a signal to a cell of a flat transparent substrate having a top surface divided into cells with side dimension d on the order of tens of nanometers and a concentric plasmonic-dielectric nanostructure disposed in each cell and selecting a ratio of radii and/or an aspect ratio for the concentric core-shell plasmonic-dielectric nanostructure in each cell so that the concentric core-shell plasmonic-dielectric nanostructure has a plasmonic resonance frequency corresponding to the value of the assigned signal sample for that cell. The signal samples in each cell are then read by applying a light source that emits broadband infrared or visible light and is positioned below the substrate so as to illuminate the substrate with a collimated beam at an angle larger than a critical angle of the substrate whereby only an evanescent wave substantially interacts with the plasmonic-dielectric nanostructures on the top surface of the substrate, reading the scattering of the evanescent wave off of the concentric core-shell plasmonic-dielectric nanostructures in each cell using a near-field scanning optical microscope (NSOM), determining a peak scattering amplitude of the scattering, and determining a value of the signal sample from the plasmonic resonance frequency of the peak scattering amplitude.

BRIEF DESCRIPTION OF THE DRAWINGS

The present invention will be apparent from the following detailed description of the invention taken in conjunction with the accompanying drawings, of which.

DETAILED DESCRIPTION OF ILLUSTRATIVE EMBODIMENTS

Figure 1:
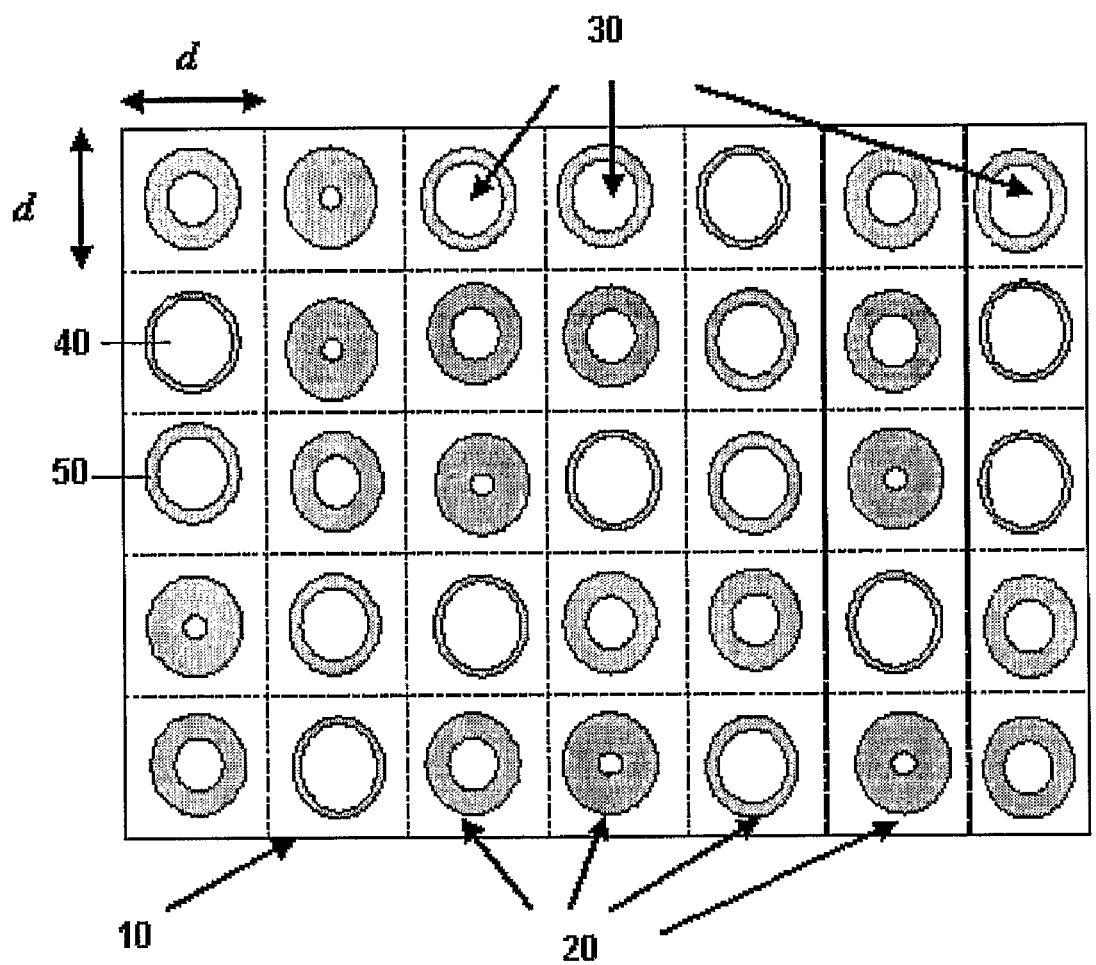
FIG. 1 illustrates one possible geometry for taking advantage of the plasmonic-dielectric resonance phenomenon by illuminating concentric two-layer core-shell plasmonic-dielectric nanostructures with IR or visible light, which could be broadband, such that the scattered wave is very strong at a given frequency.

The invention will be described in detail below with reference to FIGS. 1 through 15. Those skilled in the art will appreciate that the description given herein with respect to those figures is for exemplary purposes only and is not intended in any way to limit the scope of the invention. All questions regarding the scope of the invention may be resolved by referring to the appended claims.

Geometry of the Problem and Proposed Solution:

A flat glass substrate 10 (or any other transparent substrate such as $TiO_2$-doped glass) has a top surface divided into small square areas 20 with side dimension d, which can be in the order of tens of nanometers (e.g., 90 nm), but its final value can be selected based on certain desired specifications (such as the noise level present in the NSOM (near-field scanning optical microscope) detector, number of bits per $inch^2$, etc.). Each square area will be referred to herein as a "cell". In each cell, using electron-beam lithography or other suitable techniques, a concentric core-shell plasmonic-dielectric nanostructure 30 is printed with a certain ratio of radii and a certain aspect ratio. In each nanostructure 30, two concentric layers 40, 50 are formed as a core 40 and a shell 50; one is made of a plasmonic material, whose real part of its permittivity attains negative value (such as noble metals, e.g., silver, gold, etc.), and the other is made of a conventional dielectric material, whose permittivity has a positive real part. The ratio of radii of these two layers can be a value greater than zero and less than one. This two-layer nanostructure can also have the shape of an ellipsoid with a prescribed aspect ratio.

Figure 2:
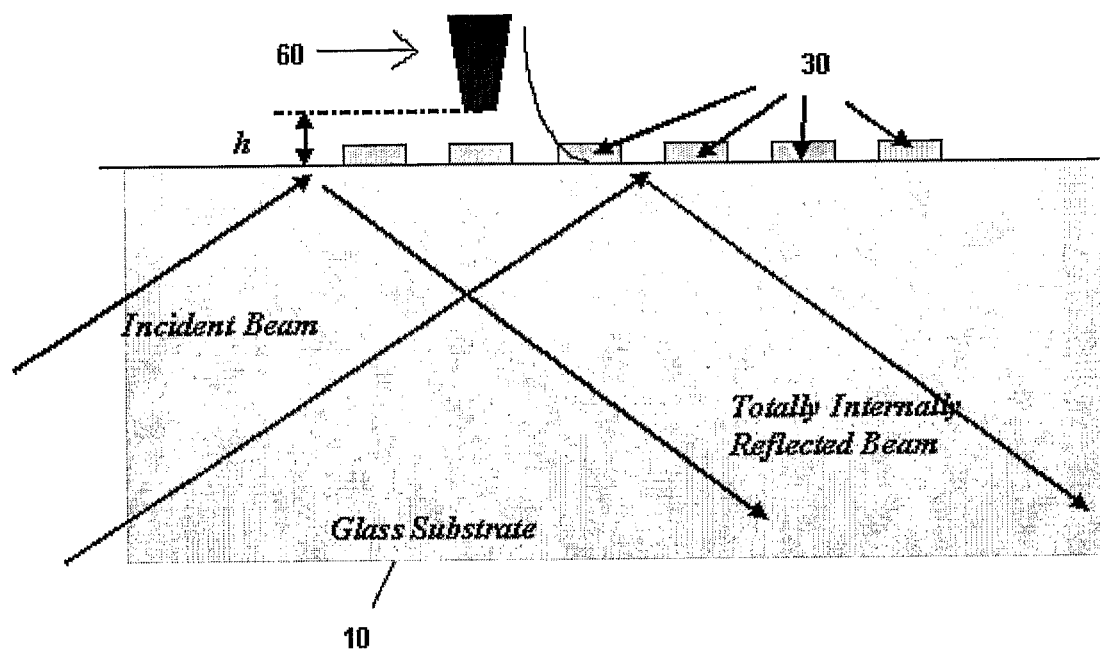
FIG. 2. illustrates a side view of the arrangement of FIG. 1 with a NSOM (near-field scanning optical microscope) to read the data.

As shown in FIGS. 1 and 2, the cells 20 comprise a collection of concentric core-shell nanostructures 30 made of noble metals such as silver, gold, aluminum, etc. as the core or shell and another dielectric (e.g., $SiO_2$) as the shell or core with a given ratio of radii and a given aspect ratio. Alternatively, the cells may comprise a cylindrical (pill box shaped) core-shell nanostructure with a uniform thickness (height), but with a different ratio of radii and a different aspect ratio of axes in the glass plane.

Figure 3:
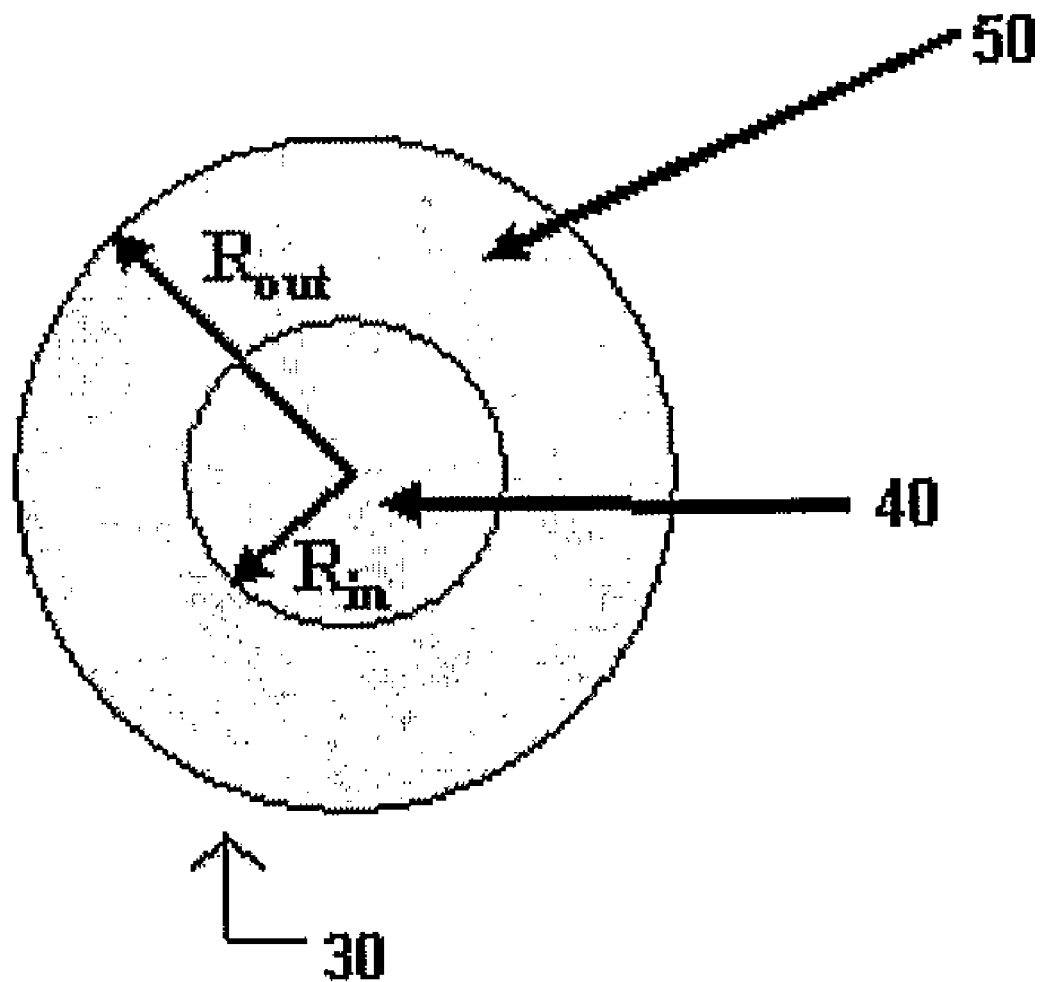
FIG. 3 illustrates the geometry of a single concentric core-shell plasmonic-dielectric nanostructure.
Figure 4:
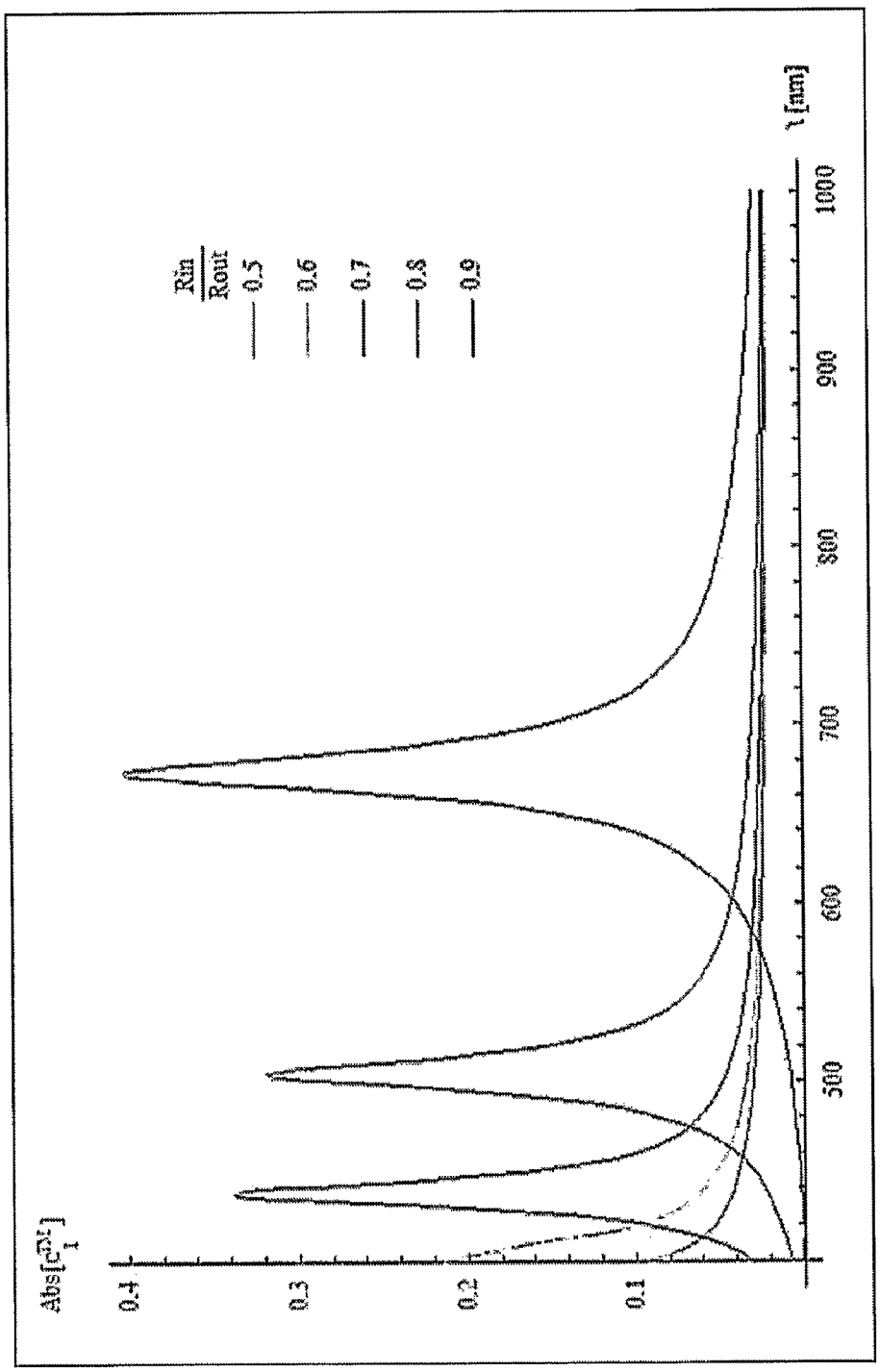
FIG. 4 illustrates the mathematical results of the magnitude of scattering amplitude from the geometry of FIG. 3, in terms of wavelength of operation, when the outer radius is assumed to be 30 nm, the outer shell is made of silver, the inner core of $SiO_2$, and the ratio of radii is varied as a parameter.

Those skilled in the art will appreciate that due to the plasmonic resonance phenomenon when a concentric core-shell plasmonic-dielectric nanostructure 30 is illuminated with an IR or visible light, which could be broadband, the scattered wave from the structure of FIG. 1 can be very strong at a given frequency, where the frequency is dependent upon many parameters including the ratio of radii and/or the aspect ratio, the material of the nanostructure, the host (or substrate) material, polarization of the illuminating electric field, shape, and size of the nanostructure. FIG. 3 shows a typical geometry of this two-layer core-shell nanostructure and FIG. 4 shows the dependence of the scattering intensity on the wavelength and ratio of radii for a core-shell spherical nanostructure made of $SiO_2$ as the core 40 and silver shell 50 with outer radius of 30 nm. Accordingly, when the substrate of FIG. 1 is illuminated using a broadband IR or visible signal, the peak of the scattering from each cell 20 is around the plasmonic resonance frequency of the core-shell nanostructure in the cell 20, and if the ratio of radii and/or the aspect ratio of the nanostructure is different from one cell to another, these peak scattering amplitudes will be at different frequencies for different cells.

Such a geometry may be used for several useful applications, including, for example, FM recording and data storage and N-ary optical data storage, as described below.

(1) Frequency-Modulated Recording and Data Storage:

It is assumed that one wishes to record a signal g(t) using frequency modulation, i.e., to associate with each amplitude level a certain frequency for the peak scattering. Specifically, if the signal is sampled at a given time interval Δt:

$$g[n] \equiv g(n\Delta t). \tag{1}$$

If the entire range of possible signal amplitude, i.e., ($g_{max} - g_{min}$) can be divided into N segments, i.e., the range of each segment will be $$\Delta g = \frac{1}{N}(g_{max} - g_{min}),$$

it can be assumed that the signal value can lie between $j^{th}$ and $(j+1)^{th}$ segments. That is:

$$g_{min} + j\Delta g \leq g[n] < g_{min} + (j+1)\Delta g \text{ where } 1 \leq j \leq N. \tag{2}$$

Then one can assign a frequency to this sampled value of g(n), i.e., $$f[n] = f\{g[n]\} = f_j \text{ where } 1 \leq j \leq N. \tag{3}$$

Figure 16:
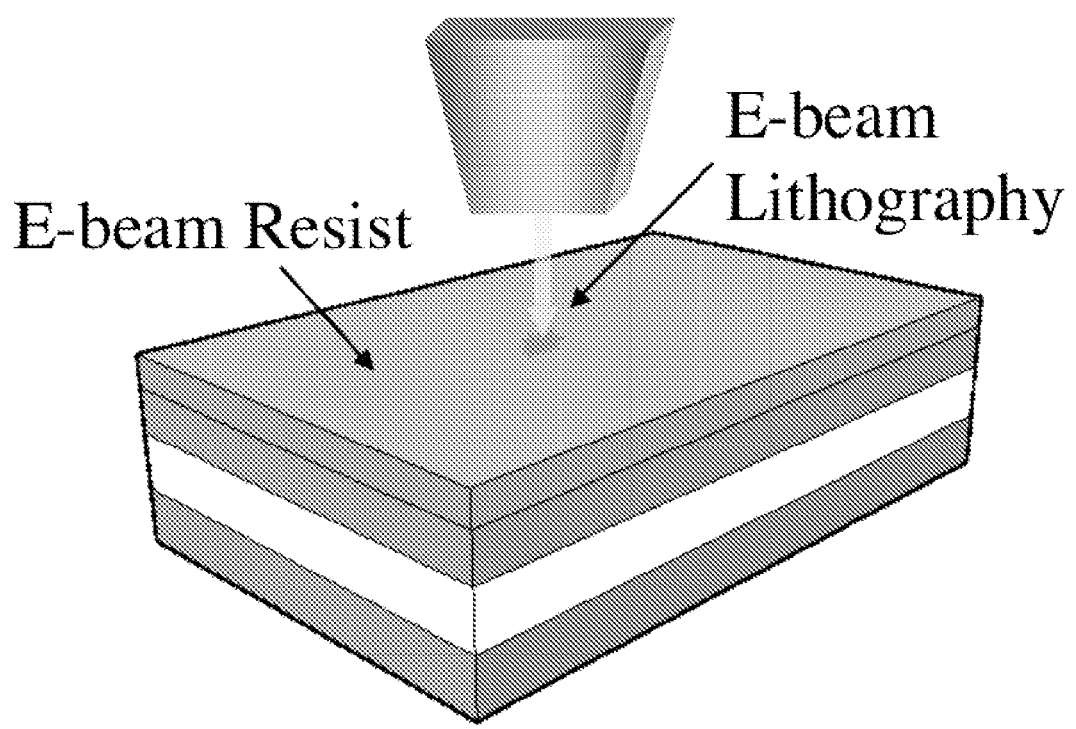
FIG. 16 illustrates printing a nanostructure on a substrate using an electron beam lithography device in accordance with the invention.

Each of these sample values of the signal g(n) can be assigned to a cell 20 in FIGS. 1 and 2, and then the ratio of radii and/or the aspect ratio of the nanostructure 30 in this cell should be selected to give rise to the plasmonic resonance frequency $f[n]$. When these plasmonic nanostructures are printed on the glass substrate using conventional e-beam lithography as illustrated in FIG. 16, one will then effectively have a frequency-modulated recorded signal for g[n] (i.e., g(t)). To read this recorded signal, one will need to illuminate this substrate (with the printed nanostructures over it) with a broadband IR or visible light from below (e.g. one can illuminate this from below using a collimated beam at an angle larger than the critical angle of the glass, thus the beam would be totally internally reflected, and only the evanescent wave would interact with the printed nanostructures on the top surface).

Figure 5:
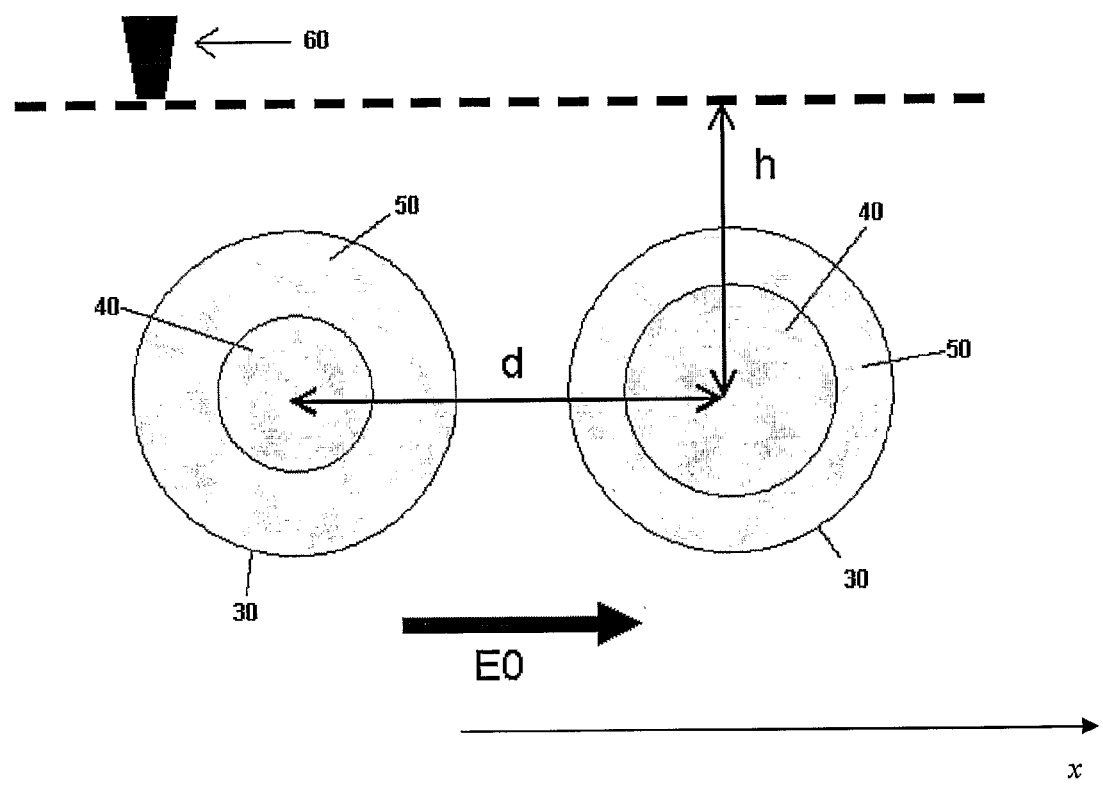
FIG. 5 illustrates the geometry of two neighboring concentric core-shell plasmonic-dielectric nanostructures with the same outer radii, the outer layer made of silver and the inner core of $SiO_2$, but with different ratios of radii, and separated by a distance d.

For example, in FIG. 5, an NSOM 60 (which can have a detection resolution of around 30 to 50 nm) is used to read the data by moving above and very near the sample. The NSOM 60 is assumed to be at a height h above the center of the nanostructures. As this NSOM moves along the sample from cell to cell, it picks up the scattered field from the nanostructure 30 in each cell 20, and the strong scattering from each cell 20 is at its plasmonic resonant frequency. So the NSOM 60 will find the value of $f[n]$ for each nanostructure 30. These data can then be mapped back to the values of the signal g(n) that they were associated with. The proximity of the nanostructures 30, which is directly related to the size of the cell 20, can in principle affect the plasmonic resonant frequency for nanostructure in each cell 20. However, this effect can be determined and may not be detrimental to the detection of plasmonic resonant frequency by each NSOM 60. As illustrated in FIG. 2, the incident beam is totally internally reflected in the glass 10, and the evanescent wave interacts with the plasmonic nanostructures 30.

FIG. 5 illustrates two adjacent core-shell plasmonic-dielectric spherical nanostructures 30 with different ratios of radii, illuminated with an incident wave whose direction of electric field is shown. Here the outer radius of each nanostructure 30 is assumed to be 30 nm, the outer shell 50 is assumed to be made of silver with well known properties, the inner core 40 is assumed to be $SiO_2$ with dielectric constant of 2.2, and separation between the centers of the two structures (i.e., the cell size) is taken to be d=90 nm. The observation point (i.e., the height of the NSOM 60 from the substrate) is assumed to be h=90 nm.

FIGS. 6-14 show numerically simulated results for the distribution of the frequency spectrum of the scattered field by two adjacent core-shell spherical plasmonic-dielectric nanostructures 30, as observed by an E-field detector (e.g., NSOM 60) moving at a fixed height h above these two structures. It can be seen from these results that the peak resonant frequency can be distinguished for the two cases of dissimilar ratios of radii for these two core-shell nanostructures 30. In FIGS. 6-14, various cases of outer radii, various ratios of radii and several NSOM heights are considered.

Figure 6:
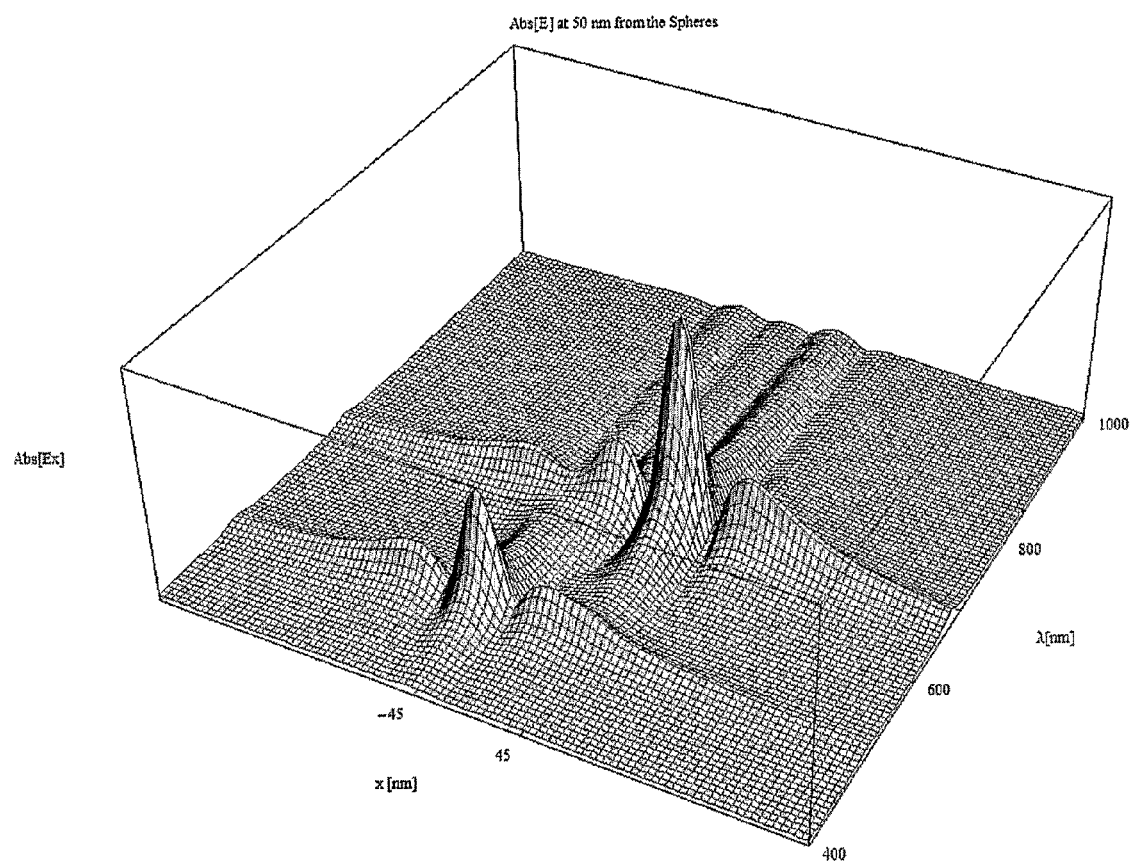
FIG. 6 illustrates a theoretical prediction of the intensity of the x-component of the scattered electric field as viewed by the NSOM, as a function of location of the NSOM (x-axis) and wavelength (wavelength axis).
Figure 7:
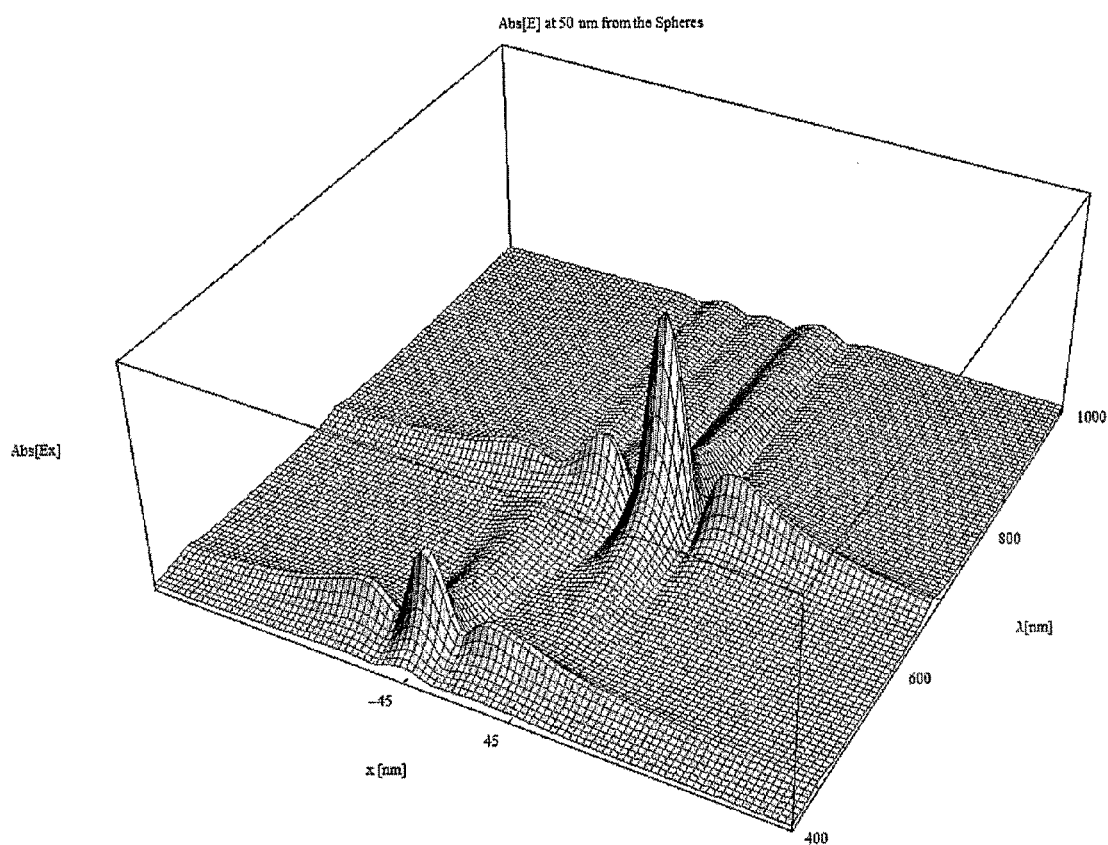
FIG. 7 is the same as in FIG. 6, except that the ratios of radii are assumed to be 0.9 and 0.7.
Figure 8:
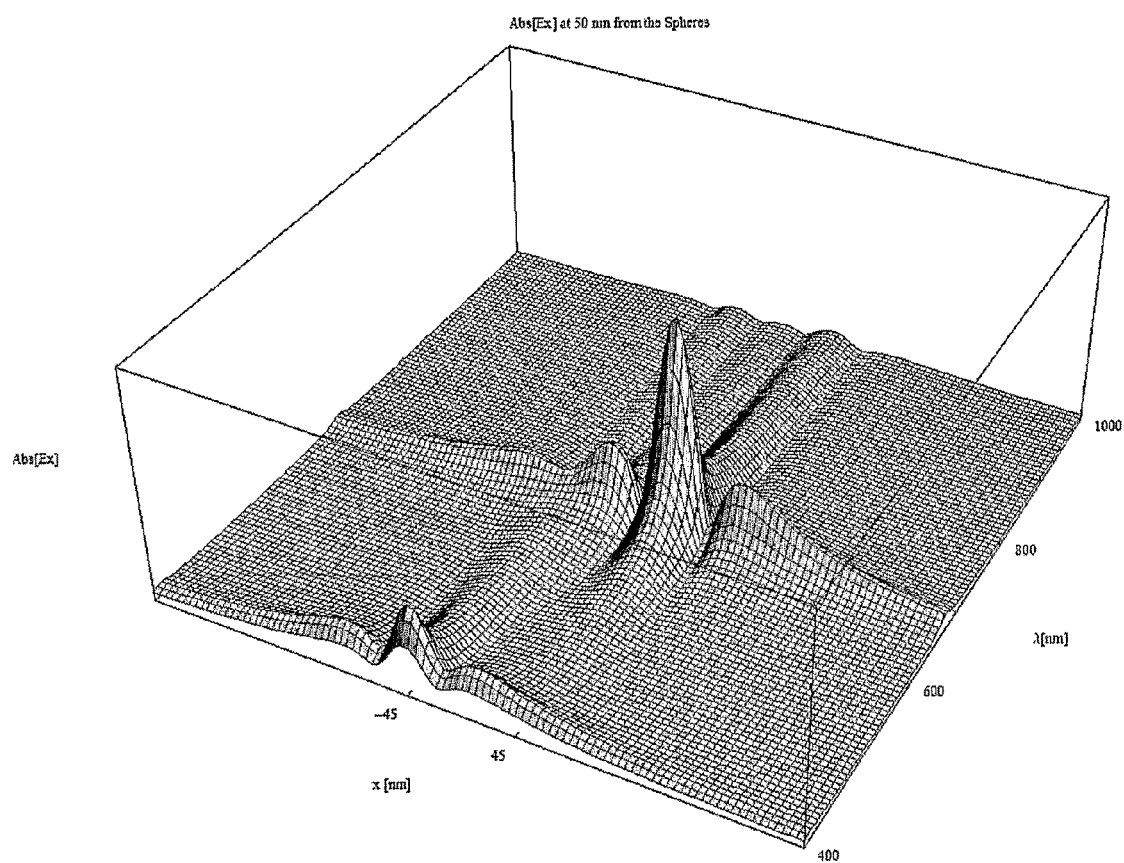
FIG. 8 is the same as in FIG. 6, except that the ratios of radii are assumed to be 0.9 and 0.6.

FIGS. 6-8 illustrate a theoretical prediction for the intensity of the x-component of scattered electric field as viewed by the NSOM 60, as a function of location of the NSOM (x axis) and wavelength (wavelength axis), for various different ratios of radii.: As the NSOM 60 moves over the first and second concentric core-shell plasmonic-dielectric nanostructures 30, the scattered field from the first nanostructure in the first cell is peaked around a wavelength different from that of scattered field from the second nanostructure in the second cell with a different ratio of radii.

FIG. 6 illustrates a theoretical prediction of the intensity of the x-component of the scattered electric field as viewed by the NSOM 60, as a function of location of the NSOM (x-axis) and wavelength (wavelength axis). The material properties of silver are obtained from the well known reference in literature: P. B. Johnson and R. W. Christy, Phys. Rev. B 6, 004370 (1972). As the NSOM 60 moves over the first and second concentric core-shell plasmonic-dielectric nanostructures 30, the scattered field from the first nanostructure is peaked around a wavelength different from that of scattered field from the second with a different ratio of radii. In this case, the outer radii are assumed to be 30 nm, the separation between two neighboring nanostructures is assumed to be d=90 nm, the ratios of radii are assumed to be 0.9 and 0.8, and the height of NSOM from the center of the particles is assumed to be 50 nm. FIG. 7 is the same as in FIG. 6, except that the ratios of radii are assumed to be 0.9 and 0.7. FIG. 8 is the same as in FIG. 6, except that the ratios of radii are assumed to be 0.9 and 0.6.

Figure 9:
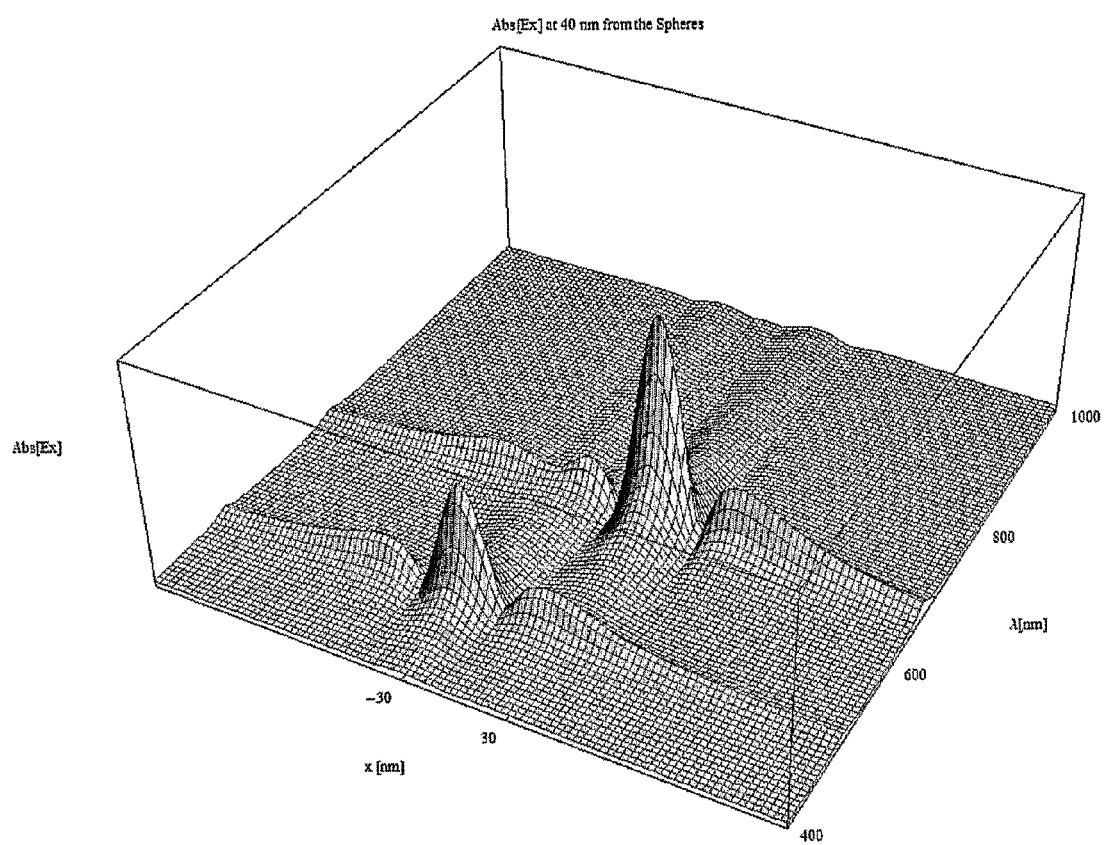
FIG. 9 is the same as in FIG. 6, except the outer radii are assumed to be 20 nm, the separation of two particles d=60 nm, and ratios of radii are assumed to be 0.9 and 0.8, and the height of NSOM from the center of the particles is assumed to be h=40 nm.
Figure 10:
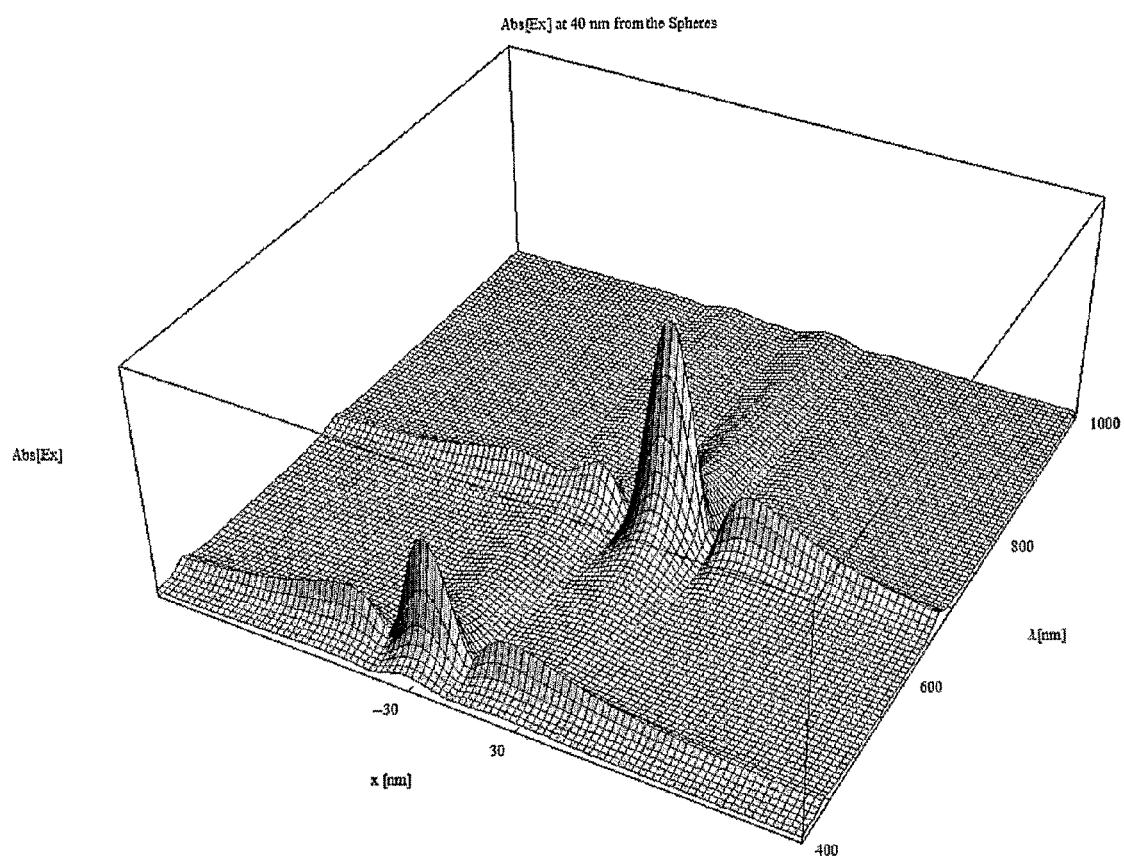
FIG. 10 is the same as in FIG. 9, except the ratios of radii are assumed to be 0.9 and 0.7.
Figure 11:
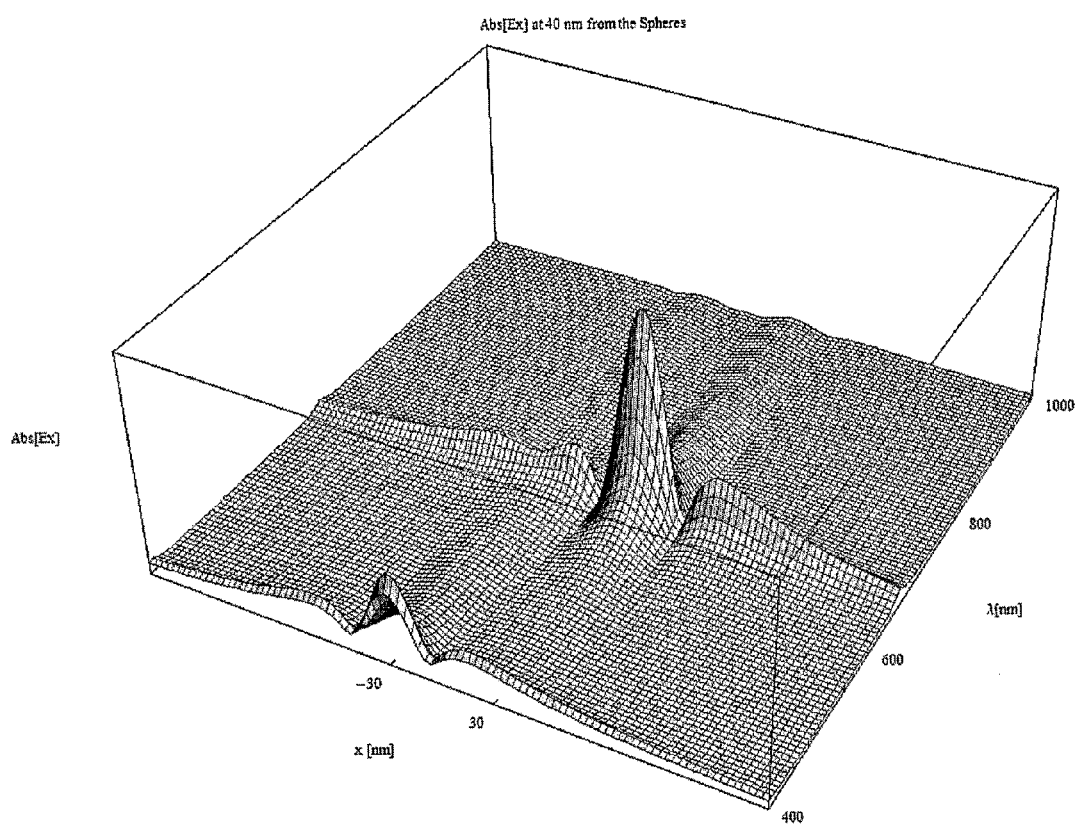
FIG. 11 is the same as in FIG. 9, except the ratios of radii are assumed to be 0.9 and 0.6.
Figure 12:
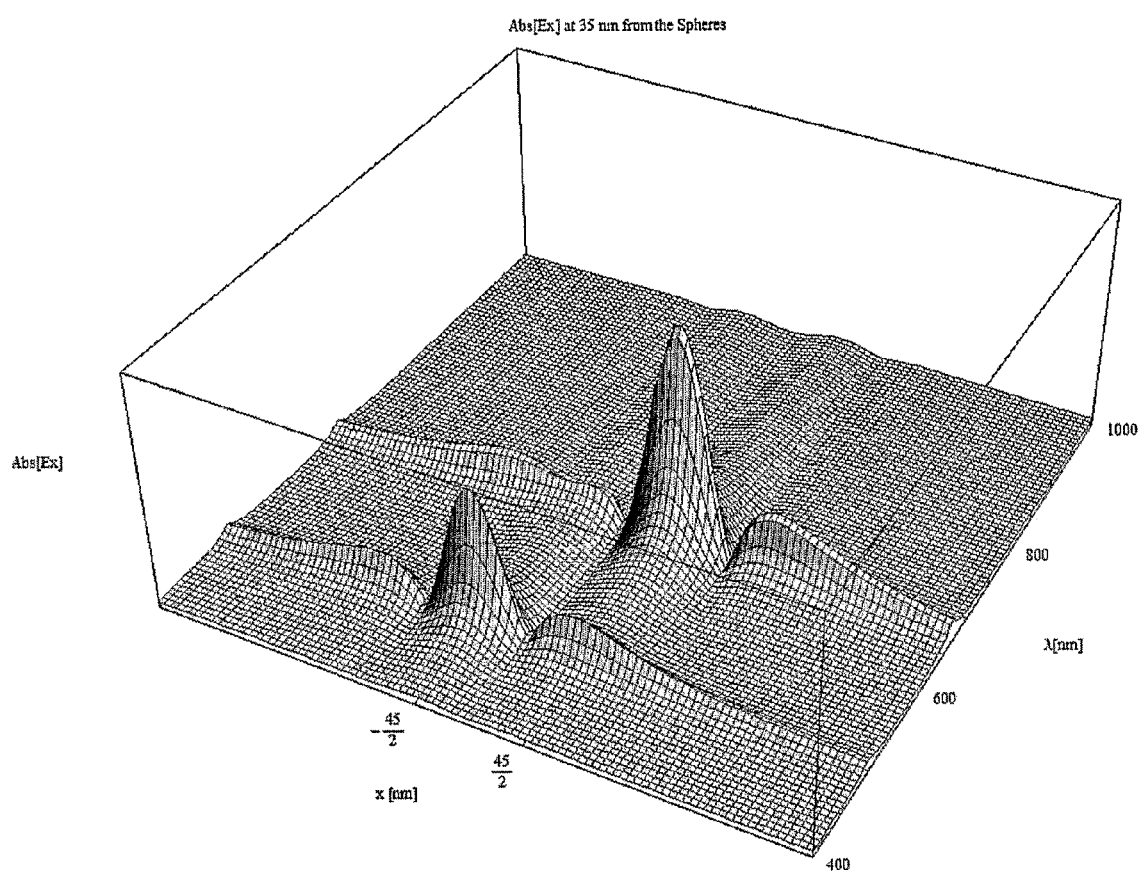
FIG. 12 is the same as in FIG. 6, except the outer radii are assumed to be 15 nm, the separation of two particles d=45 nm, and ratios of radii are assumed to be 0.9 and 0.8, and the height of NSOM from the center of the particles is assumed to be h=35 nm.
Figure 13:
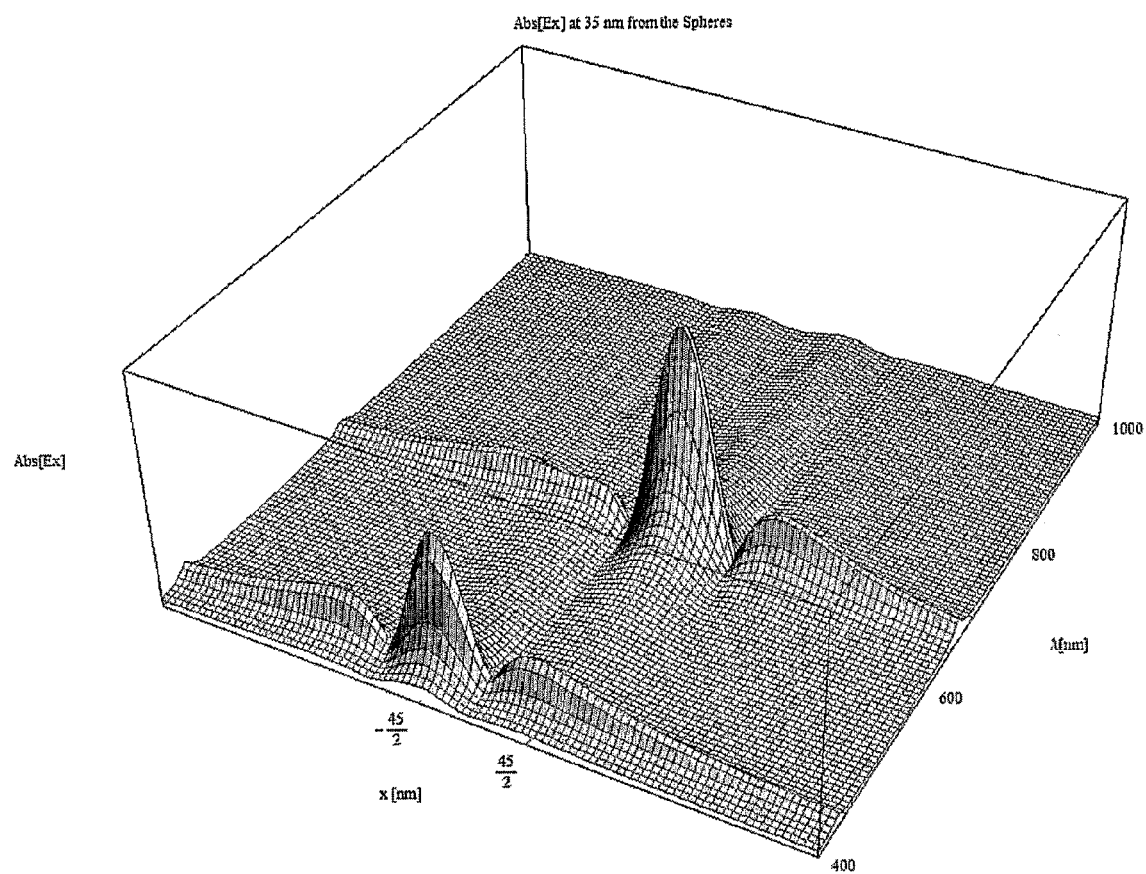
FIG. 13 is the same as in FIG. 12, except that that the ratios of radii are assumed to be 0.9 and 0.7.
Figure 14:
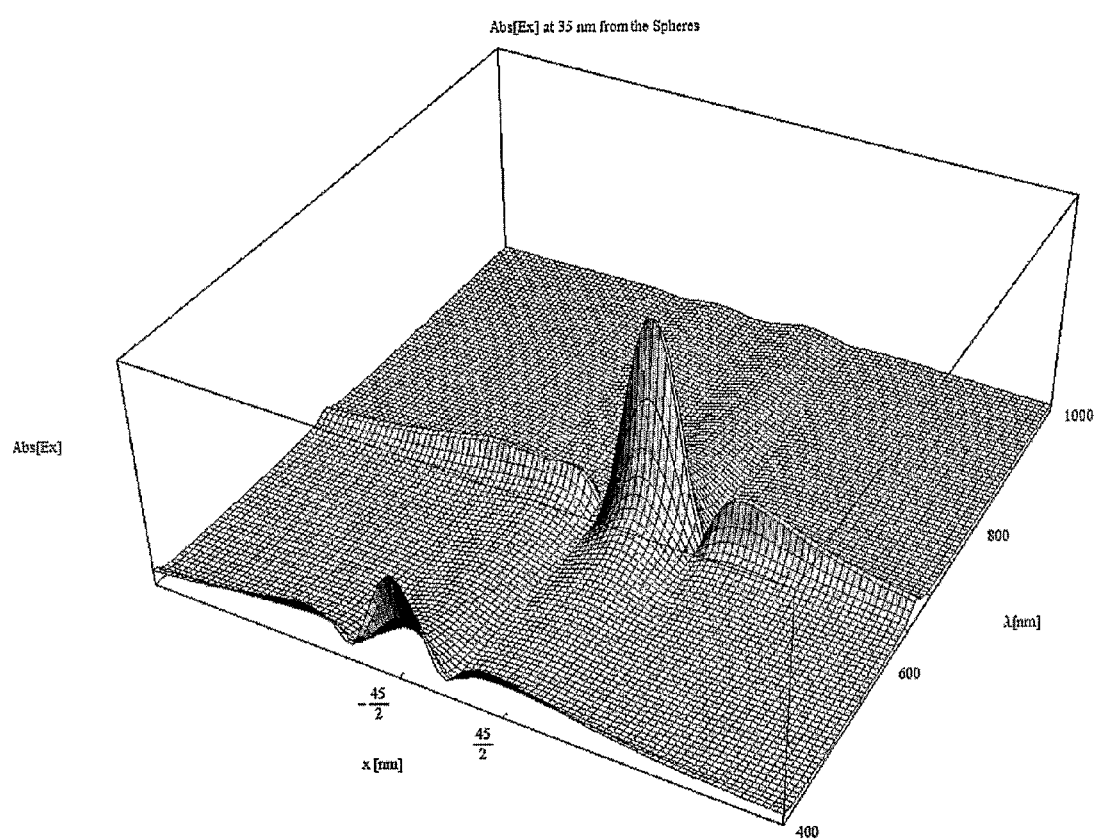
FIG. 14 is the same as in FIG. 12, except the ratios of radii are assumed to be 0.9 and 0.6.

FIG. 9 is the same as in FIG. 6, except that the outer radii are assumed to be 20 nm, the separation of two particles d=60 nm, and ratios of radii are assumed to be 0.9 and 0.8, and the height of NSOM from the center of the particles is assumed to be h=40 nm. FIG. 10 is the same as in FIG. 9, except that the ratios of radii are assumed to be 0.9 and 0.7. FIG. 11 is the same as in FIG. 9, except that the ratios of radii are assumed to be 0.9 and 0.6. FIG. 12 is the same as in FIG. 6, except that the outer radii are assumed to be 15 nm, the separation of two particles d=45 nm, and ratios of radii are assumed to be 0.9 and 0.8, and the height of NSOM from the center of the particles is assumed to be h=35 nm. FIG. 13 is the same as in FIG. 12, except that the ratios of radii are assumed to be 0.9 and 0.7. FIG. 14 is the same as in FIG. 12, except that the ratios of radii are assumed to be 0.9 and 0.6. Characteristic intensities may be observed in each figure.

(2) N-ary Optical Data Storage:

The embodiment described above may be modified in order to provide a technique for data recording and storage for binary, trinary, or in general N-ary data using the concentric core-shell plasmonic-dielectric nanostructures 30 with two, three or N different ratio of radii and/or N different aspect ratios. If one chooses N different ratio of radii or N different aspect ratios for the plasmonic nanostructures 30, one can have N different plasmonic resonant frequencies. Thus, each binary digit (or N-ary digit) can be represented by each of the N plasmonic resonant frequencies. Each cell will have a printed nanostructure with a specific ratio of radii and/or aspect ratio, and thus is associated with each N-ary digit. The recording and reading strategies are similar to what was described above with respect to the embodiment of FIGS. 1 and 2.

In both embodiments of the invention, the density of stored data can be higher than some of the presently available data storage techniques. For example, in a 1 μm×1 μm surface area, one can have $10^6/d^2$ cells (where d is in the unit of nanometer). So, for d=90 nm, 60 nm, or 45 nm, there would be around 123, 277, or 493 cells, respectively, whereas a regular compact disk has about 4 cells in such an area. In addition, if N-ary modulation (instead of binary) is used, the data storage capacity may be increased by a factor of $\ln(N)/\ln(2)$. So in principle, one may be able to increase the data storage capacity (with respect to the CD storage of 4 cells per 1 μm×1 μm) by a factor of 123 $\ln(N)/\ln(2)$, 277 $\ln(N)/\ln(2)$, or 493 $\ln(N)/\ln(2)$, respectively.

Figure 15:
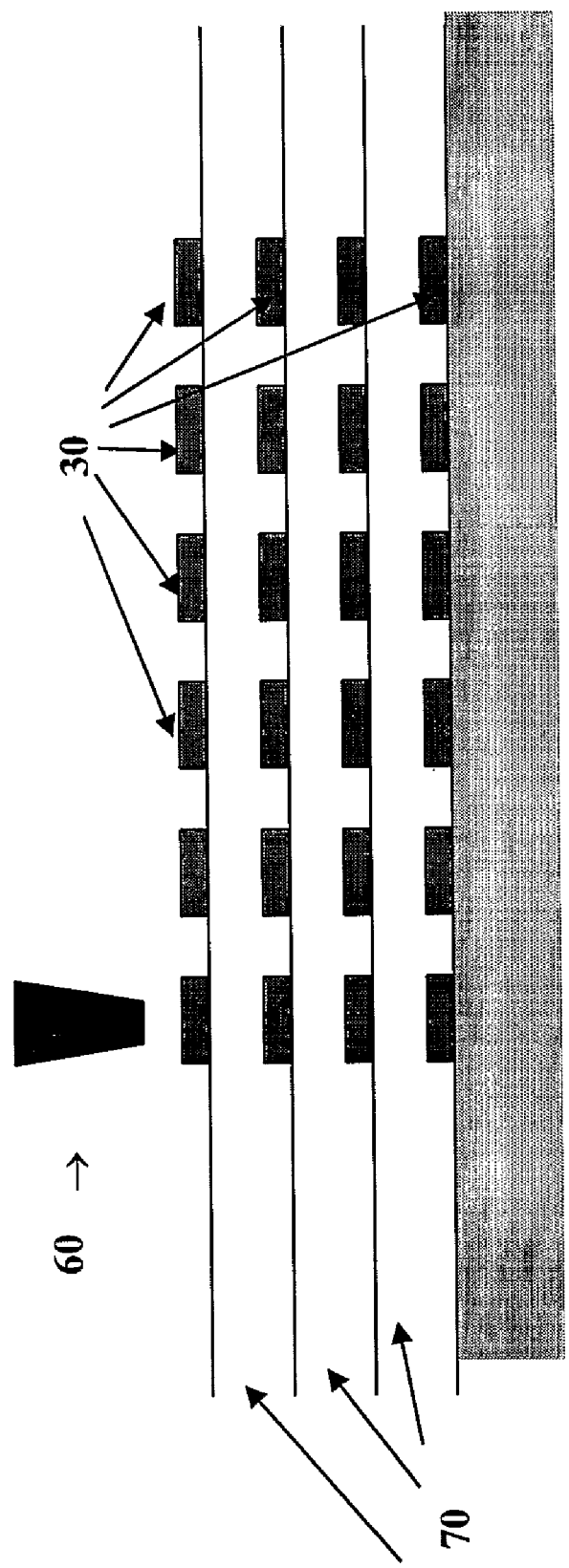
FIG. 15 illustrates an embodiment of the invention for 3-D plasmonic optical storage.

Those skilled in the art will appreciate that the invention may also be extended to 3-D data storage where several layers of glass with these nanostructures 30 printed on each layer 70 can be constructed as illustrated in FIG. 15. When the incident beam interacts with the cells 20 in a column, the plasmonic resonant frequency for each cell in a column can be detected by the NSOM 60 located on the top layer.

Those skilled in the art will also appreciate that numerous other modifications to the invention are possible within the scope of the invention. Accordingly, the scope of the invention is not intended to be limited to the preferred embodiments described above, but only by the appended claims.

What is claimed:

1. A storage device comprising:
    a flat transparent substrate having a top surface divided into cells with side dimension d on the order of tens of nanometers; and
    a plasmonic nanostructure disposed in each cell, each plasmonic nanostructure comprising an overlapping two-layer plasmonic-dielectric structure having a predetermined ratio of radii between the layers and/or a predetermined aspect ratio of each layer, different respective ratios of the predetermined ratio of radii and/or predetermined aspect ratio of each layer in each cell causing said plasmonic-dielectric nanostructures in each cell to have peak scattering amplitudes at different plasmonic resonance frequencies in response to an applied infrared or visible wavelength signal.

2. The storage device of claim 1, wherein the flat transparent substrate is glass.

3. The storage device of claim 1, wherein the flat transparent substrate is TiO2-doped glass.

4. The storage device of claim 1, wherein the two layers of the plasmonic-dielectric structure include a plasmonic layer made of a noble metal and a dielectric layer that is concentric with the plasmonic layer and the dielectric layer has a prescribed ratio of radii with respect to the plasmonic layer and a prescribed aspect ratio.

5. The storage device of claim 1, wherein a plasmonic nanostructure comprises a cylindrical core-shell plasmonic-dielectric nanostructure having a uniform thickness but with different ratio of radii of plasmonic and dielectric layers and different aspect ratio of axes of the layers in a plane of the substrate.

6. The storage device of claim 1, wherein the plasmonic-dielectric nanostructure in the cell has a peak scattering amplitude at a prescribed plasmonic resonant frequency in response to said applied infrared or visible wavelength signal.

7. The storage device of claim 1, further comprising a plurality of said flat transparent substrates disposed on top of one another, each transparent substrate having a top surface divided into cells with side dimension d on the order of tens of nanometers and a plasmonic nanostructure disposed in each cell.

8. The storage device of claim 7, wherein the layers of the plasmonic-dielectric nanostructures have N different ratios of radii and/or N different aspect ratios, and N different plasmonic resonant frequencies, each plasmonic resonant frequency representing a respective N-ary digit of data stored in said storage device.

9. The storage device of claim 1, wherein the ratio of radii of a plasmonic layer with respect to a dielectric layer is greater than zero and less than one.

10. A data storage and playback system comprising:
    a flat transparent substrate having a top surface divided into cells with side dimension d on the order of tens of nanometers;
    a plasmonic nanostructure disposed in each cell, each plasmonic nanostructure comprising an overlapping two-layer plasmonic-dielectric structure having a predetermined ratio of radii between the layers and/or a predetermined aspect ratio of each layer, different respective ratios of the predetermined ratio of radii and/or predetermined aspect ratio of each layer in each cell causing said plasmonic-dielectric nanostructures in each cell to have peak scattering amplitudes at different plasmonic resonance frequencies in response to an applied infrared or visible wavelength signal;
    a reader comprising a light source that emits broadband infrared or visible light and that is positioned below said substrate so as to illuminate the substrate with a collimated beam at an angle larger than a critical angle of the substrate whereby only an evanescent wave substantially interacts with the plasmonic nanostructures on the top surface of the substrate; and
    a near-field scanning optical microscope (NSOM) that reads the scattering of the evanescent wave off of the plasmonic nanostructures in respective cells.

11. A method of creating a nanoscale storage device, comprising:
    assigning each of n sampled values g(n) possible for coding a signal g(t), where n is a number of sampled values, to a cell of a flat transparent substrate having a top surface divided into cells with side dimension d on the order of tens of nanometers and a plasmonic nanostructure disposed in each cell;
    selecting a ratio of radii and/or an aspect ratio for overlapping plasmonic and dielectric layers of a plasmonic-dielectric nanostructure in each cell so that the plasmonic nanostructure has a plasmonic resonance frequency f(n) corresponding to the value of the assigned signal sample for that cell as $f(n)=f\{g(n)\}=F_j$, where $1 \leq j \leq n$; and
    printing the overlapping plasmonic and dielectric layers with the selected ratio of radii and/or aspect ratio in each respective cell on said flat transparent substrate.

12. The method of claim 11, wherein the printing step comprises printing the plasmonic nanostructures in each cell on said substrate using electron-beam lithography.

13. The method of claim 12, wherein the printing step comprises printing the plasmonic nanostructures so as to comprise concentric core-shell plasmonic-dielectric structures with a predetermined ratio of radii of the plasmonic and dielectric layers and a prescribed aspect ratio.

14. The method of claim 12, wherein the printing step comprises printing the plasmonic nanostructures so as to comprise cylindrical core-shell plasmonic-dielectric nanostructures having a uniform thickness but with different ratio of radii of the plasmonic and dielectric layers and different aspect ratio of axes of the layers in a plane of the substrate.

15. The method of claim 11, wherein the selecting step comprises selecting the layers of the plasmonic-dielectric nanostructures so as to have N different ratios of radii and N different aspect ratios, and N different plasmonic resonant frequencies for N sample values, each plasmonic resonant frequency representing a respective N-ary digit of data stored in the storage device.

16. A method of reading data from a nanoscale storage device in which n sampled values g(n) possible for coding a signal g(t), where n is a number of sampled values, have been assigned to respective cells of a flat transparent substrate having a top surface divided into cells with side dimension d on the order of tens of nanometers and a plasmonic nanostructure disposed in each cell, comprising:
    reading the signal samples in each cell of the nanoscale storage device by applying a light source that emits broadband infrared or visible light and is positioned below said substrate so as to illuminate the substrate with a collimated beam at an angle larger than a critical angle of the substrate whereby only an evanescent wave substantially interacts with the plasmonic nanostructures on the top surface of the substrate;

reading the scattering of the evanescent wave off of the plasmonic nanostructures in each cell using a near-field scanning optical microscope (NSOM);

determining a peak scattering amplitude of the scattering; and determining a value of the signal sample from the plasmonic resonance frequency of the peak scattering amplitude.

* * * * *